United States Patent [19]

Jessee

[11] Patent Number: 4,504,899
[45] Date of Patent: Mar. 12, 1985

[54] INVERTER FIRING CONTROL WITH ERROR COMPENSATION

[75] Inventor: Ralph D. Jessee, Shawnee Township, Allen County, Ohio

[73] Assignee: Westinghouse Electric Corp., Pittsburgh, Pa.

[21] Appl. No.: 490,261

[22] Filed: Apr. 29, 1983

[51] Int. Cl.³ .......................................... H02H 7/122
[52] U.S. Cl. ........................................ 363/56; 363/41
[58] Field of Search .................... 363/17, 41, 98, 132, 363/133, 134, 56, 58

[56] References Cited

U.S. PATENT DOCUMENTS

| | | | |
|---|---|---|---|
| 3,710,229 | 1/1973 | Jessee | 321/9 A |
| 3,715,649 | 2/1973 | Ravas | 321/45 R |
| 3,967,173 | 6/1976 | Stich | 318/227 |
| 4,166,247 | 8/1979 | Miyazawa | 363/41 |
| 4,228,491 | 10/1980 | Abraham et al. | 363/41 |
| 4,291,368 | 9/1981 | Yarema et al. | 363/41 |
| 4,466,052 | 8/1984 | Thrap | 363/41 |

Primary Examiner—William H. Beha, Jr.
Assistant Examiner—Jeffrey Sterrett
Attorney, Agent, or Firm—R. P. Lenart

[57] ABSTRACT

A pole switch firing control for a pulse width modulated inverter controls pole switch operation under steady-state operating conditions such that the inverter output duplicates a reference signal waveform after a fixed time delay. Pole switch operating time for a given pulse in an inverter output cycle is measured by counting a sequence of clock pulses to get a count equivalent to the delay time of the pole switch. This count then serves as the starting point for a presettable counter which begins to count upon the occurrence of a transition point in the reference waveform. When the presettable counter reaches a preselected count, the pole switch operating cycle is initiated, thereby causing the pole switch to operate at a fixed time following a transition point in the reference signal.

8 Claims, 3 Drawing Figures

INVERTER FIRING CONTROL WITH ERROR COMPENSATION

BACKGROUND AND SUMMARY OF THE INVENTION

This invention relates to electrical inverters and more particularly to circuits for controlling power pole switching in pulse width modulated inverters.

Pulse width modulated DC-to-AC inverters approximate sine wave outputs by switching power pole switches at a rate higher than the fundamental sine wave frequency of the AC output. In the design of pulse width modulated DC-to-AC inverters, it is desirable to switch the power stage in a manner which reduces certain harmonics to low values so as to ease the burden of filtering the output power to obtain a sinusoidal voltage wave. Fairly small errors in switching times can produce harmonic voltages many times greater than desired. This usually results in the circuit filter being made considerably larger than theoretically necessary to suppress these harmonics.

In a transistor inverter, for example, it is necessary to provide an underlap condition to prevent shoot-through during the switching operation. This means that to switch an output point from one polarity to another, there must be a delay after the conducting transistor is turned off, to be sure it is no longer conducting, before the other transistor is turned on. Many times load conditions are such that the second transistor does not conduct at all since load current is shunted through a commutating diode, thereby shortening the switching time to that of the transistor turn-off time. The transistor switching time is quite variable depending on the instantaneous load current as well as the transistor turn-off characteristic. Therefore, the prescribed switching schedule may not be met, resulting in unpredicted harmonics.

The present invention minimizes output distortion due to switching errors by predicting the switching time required for each switching point and using this prediction to adjust the starting time for each switching period so that switching is accomplished on schedule. In general, a reference waveform which is to be reproduced at the power pole output will be available to the switching control circuitry. Pulses within the reference wave are to be reproduced at the power pole output after a preselected time interval. This delayed switching schedule is accomplished by measuring the power pole switching time for a given pulse in an output cycle and subtracting the measured switching time from the preselected time interval to obtain a delay time. The switching period for the corresponding pulse in the succeeding output cycle is then initiated at a point equal to the delay time, as obtained from the previous cycle, following the appropriate reference waveform pulse. This process is repeated for each power pole output pulse. During steady-state operation, it is reasonable to expect that switching periods will be the same length at corresponding switching points in each subsequent cycle. Therefore, the power pole will switch after a preselected time interval following the reference wave pulses.

A circuit which performs the described delayed pole switching function is disclosed in my copending application, Ser. No. 355,073, filed Mar. 5, 1982, and entitled "Inverter Firing Control with Compensation for Variable Switching Delay", now U.S. Pat. No. 4,443,842. That application discloses a circuit and method for eliminating distortion in inverters caused by variability in switching delays of power poles, and is hereby incorporated by reference. Although tests of the circuit disclosed in that application confirmed the operation as described, random instabilities occurred causing momentary disturbances in the output voltage of the inverter. This invention seeks to remove the instability problem by eliminating the need for a comparator circuit and ensuring that only complete clock pulses are counted during the timing intervals.

A pole switch firing control circuit for controlling a pulse width modulated inverter constructed in accordance with this invention comprises: means for receiving a clock signal containing voltage pulses; means for generating a control signal having transition points for initiating a pole switch switching sequence in the inverter; a first counter for counting the number of clock voltage pulses which occur between a selected transition point in the control signal and the actual switching of an associated pole switch; means for storing the number of voltage pulses counted by the first counter during each pole switch switching sequence; and a second counter which is presettable to start counting at a number equal to the number of voltage pulses counted by the first counter during a preceding switching sequence, and connected to count the clock voltage pulses which occur after a preselected transition point of a reference signal until a preselected count has been reached, whereupon the second counter produces a carry output signal which causes the means for producing a control signal to create a second transition point in the control signal to initiate a second pole switch switching sequence in the inverter.

By appropriately timing the switching function, multiple phase inverters can be controlled by a single control circuit. The means for storing the number of voltage pulses counted by the first counter may be a shift register, which stores the count of the first counter during each switching sequence and delivers the appropriate stored count to the presettable counter at an appropriate time to produce the desired inverter output waveform.

The circuit of this invention controls the switching of a power pole switch in a pulse width modulated inverter in accordance with a method comprising the steps of: counting a series of clock pulses, which occur between a preselected transition point in a control signal and the actual switching of a power pole switch in response to the transition point, with a first counter; presetting a second counter at a count equal to the number of clock pulses counted by the first counter; operating the second counter to count clock pulses, beginning at the preset count, when a preselected transition point occurs in a reference signal; and causing a second transition point in the control signal to occur when the second counter reaches a predetermined count, thereby initiating a switching sequence in the power pole switch.

DESCRIPTION OF THE PREFERRED EMBODIMENTS

Figure 1:
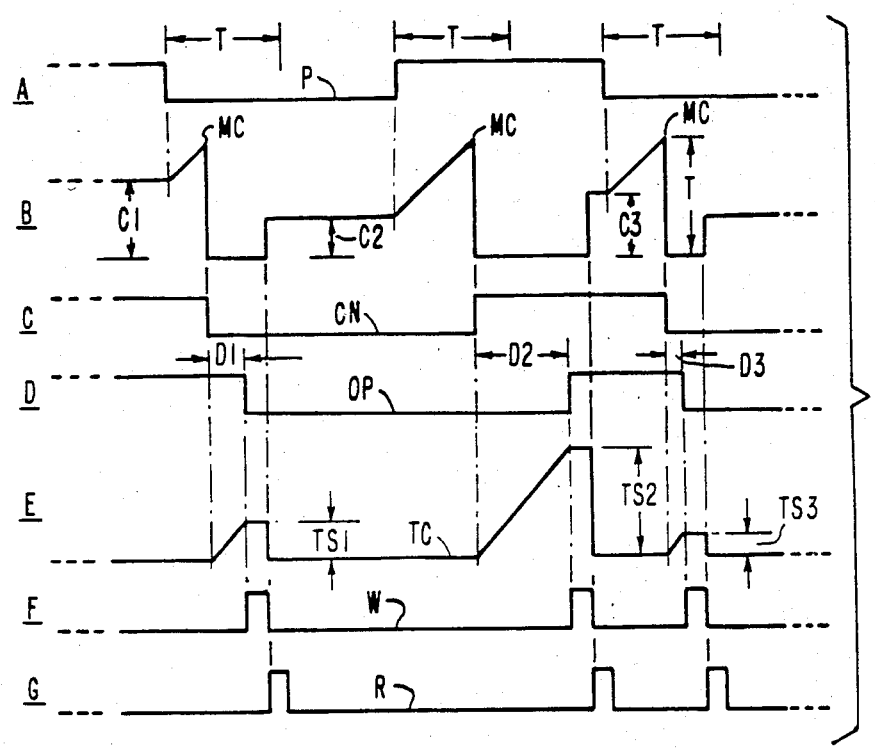
FIG. 1 is a series of waveforms illustrative of the function of an inverter firing control in accordance with the present invention, during a transient cycle of the inverter.

Referring to the drawings, the waveforms of FIG. 1 illustrate the operation of the inverter firing control method and apparatus of this invention for a portion of a single transient output cycle of a pulse width modulated inverter. Waveform A of FIG. 1 shows a pulse wave P which is part of a reference signal that is to be reproduced at the inverter power pole output. The reference signal may be generated within the inverter firing control circuitry or may be received from an external source. A fixed time interval T is shown with respect to each transition point of pulse wave P. This invention acts to make the inverter power pole switch at the end of each period T, thereby causing the inverter output to reproduce the reference signal. To maintain proper firing control function, time interval T must be at least as long as the maximum switching time of the power pole.

Waveform B of FIG. 1 represents an accumulated number of clock pulses counted by a presettable counter having a preset number of counts, for example, C1, C2, and C3, and being enabled to count following a transition point in pulse wave P. The presettable counter has a maximum count MC, which corresponds to the desired delay time T.

Waveform C of FIG. 1 illustrates a control signal CN which responds to the count of the presettable counter by including a transition point each time the maximum count MC is achieved. These transition points are used to initiate the power pole switching sequence of the inverter. During steady-state operation, it is reasonable to expect that switching times will be the same length at corresponding switching points in each subsequent cycle. Therefore, if a switching sequence is initiated after a delay TS, which is equivalent to the difference between a fixed time interval T and the previous cycle switching time, the actual switching should occur after a full time interval T.

The means used to achieve this result are illustrated by the other waveforms of FIG. 1. Waveform D shows output signal OP which represents the inverter output pole voltage. Switching delays D1, D2, and D3 are indicated following each transition of control signal CN. Waveform E of FIG. 1 is a control signal TC and represents an accumulated count in a timekeeper counter which measures switching time of the power pole. This function is accomplished by a second counter which starts to count clock voltage pulses upon the occurrence of a transition point in control signal CN. Counting stops when the power pole switches, leaving a count equivalent to the delay time TS, to be used to control a pulse during the next output cycle. This count is then stored in a memory element such as a random access memory or shift register.

Waveform F of FIG. 1 represents a pulse wave W which causes data from the second counter, needed in the next output cycle, to be entered into the memory element which advances and transfers data appropriate to the next switching operation to the presettable counter. The number of stages in the memory, which may be a shift register, is equal to the number of power pole switching operations in an inverter output cycle. Waveform G of FIG. 1 represents a pulse wave R which resets the second counter after its data has been entered into the shift register.

Figure 2:
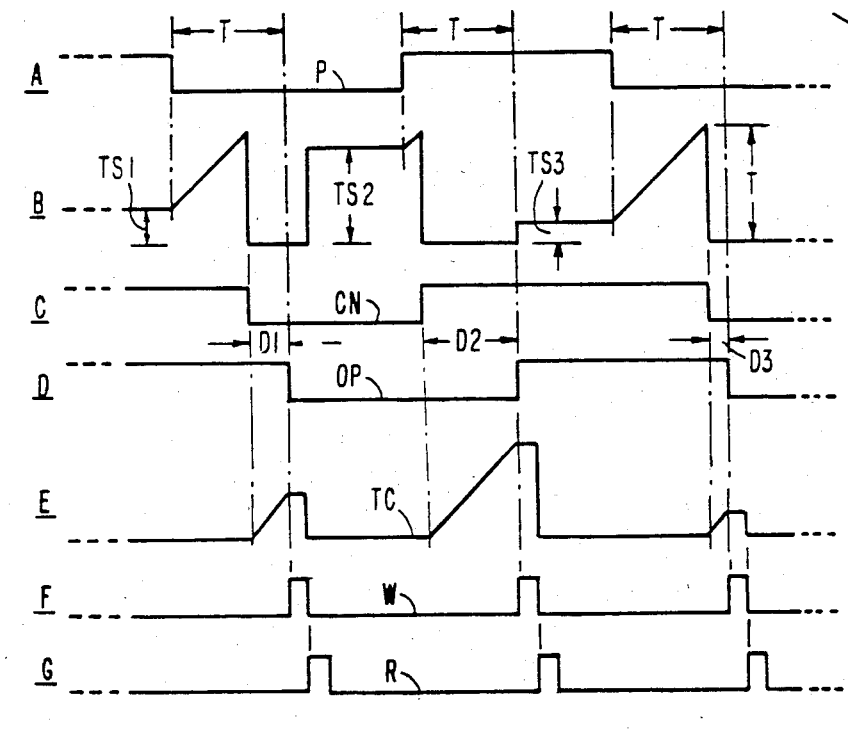
FIG. 2 is a series of waveforms illustrative of the function of an inverter firing control in accordance with this invention, for an inverter output cycle succeeding the output cycle represented by FIG. 1.

The waveforms of FIG. 2 illustrate the function of the invention for an inverter output cycle succeeding the transient output cycle represented by the waveforms of FIG. 1. During this cycle, the transition points of control signal CN are delayed by a time equal to the time required for the presettable counter to count from its preset value to its maximum count following a transition point in reference waveform pulse wave P. For steady-state operation, the switch operating time for a given pulse in a cycle should equal the switch operating time for the corresponding pulse in the previous cycle. Therefore, the inverter output signal OP switches after a delay D1 following the first transition of control signal CN. This results in switch operation at a fixed time interval T following a transition point of reference waveform pulse wave P.

Under steady-state conditions, the process continues for each pulse in the output cycle with the sum of the control signal delay and the switching delay always equal to the fixed time interval T. An examination of the waveforms of FIG. 1 reveals that the output signal OP does not switch after a fixed time interval T following a transition point in the reference pulse wave P. This illustrates the circuit response when a transient condition occurs just prior to the observed sample cycle. When steady-state conditions return, the switching schedule will be satisfied.

Figure 3:
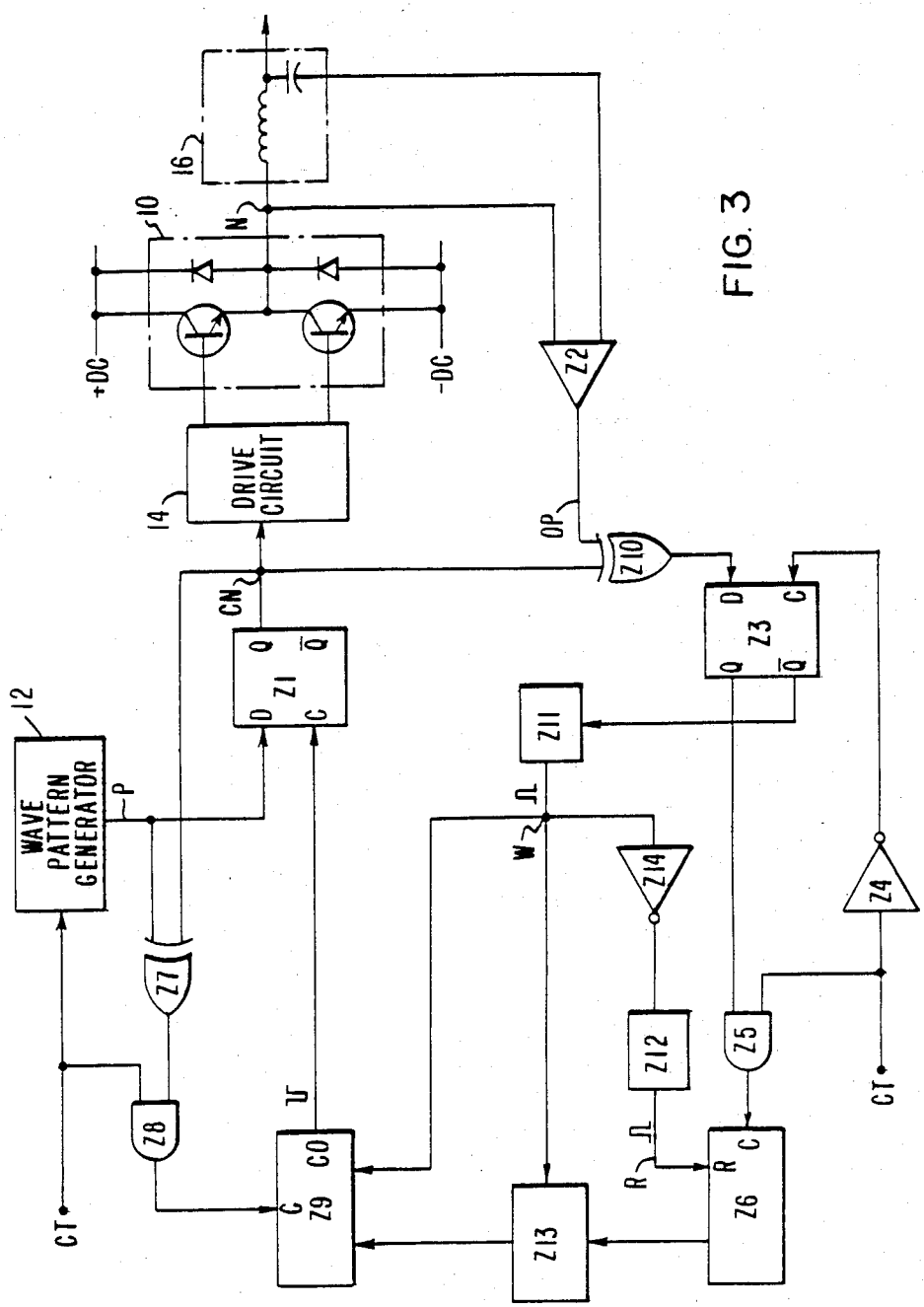
FIG. 3 is a schematic diagram of an inverter firing control circuit constructed in accordance with one embodiment of this invention.

FIG. 3 is a schematic diagram of a firing control circuit constructed in accordance with one embodiment of the present invention. For simplicity, only one power pole switching element 10 is illustrated. However, it should be understood that this invention can be applied to multiple phase inverters through the use of appropriate known drive circuitry. Terminals CT serve as means for receiving a clock signal comprising a series of voltage pulses. The desired output switching pattern represented by reference waveform P is developed in waveform pattern generator 12 in response to the clock pulse signal. Flip-flop circuit Z1, which may be a type D flip-flop as illustrated, serves as means for generating control signal CN having transition points as illustrated in FIGS. 1 and 2. Drive circuit 14 is constructed in accordance with known technology and serves to drive power pole 10 in accordance with control signal CN. Comparator Z2 compares the voltage appearing at point N with a voltage signal taken from filter 16 to produce output signal OP.

The combination of flip-flop circuit Z3, inverter Z4, and AND circuit Z5 ensure that only complete clock pulses are applied to a first counter Z6. Flip-flop Z3 transmits an enable signal allowing clock pulses to be received by counter Z6 following a transition point in control signal CN. A change in the signal at the Z3 flip-flop D input is transmitted to the Q output only when the clock pulse goes low because of the inverted clock signal to the C input of the flip-flop. If signals at both D and Q are low and the signal at D goes high while the clock pulse is high, the counter input must remain low until Q goes high as a result of the falling clock signal. Thus the counter Z6 can only receive a full first clock pulse. Likewise, should D and Q be high and D go low during a high clock pulse there can be no change in Q until the clock pulse falls, again ensuring a complete clock pulse at the counter. Although this can result in a full clock pulse period of error in the recorded power pole switching time, this is considered to be insignificant compared to a possible misreading by the counter if it were to count incomplete clock pulses. Thus the addition of flip-flop Z3 ensures correct data transmission to counter Z6 and removes a possible source of erratic operation.

When reference waveform P, control signal CN, and output signal OP all agree, the circuit is at rest. When waveform P changes state, causing disagreement with control signal CN, the output of exclusive OR gate Z7 goes high, thereby allowing AND gate Z8 to transmit clock pulses to presettable counter Z9. Z9 counts to a predetermined value, which may be its full capacity, whereupon its carry-out signal goes low. On the next clock pulse, all the counter outputs go to zero and the carry-out signal rises. This causes flip-flop Z1 to operate and change the state of control signal CN which once again agrees with reference waveform P, thereby stopping counter Z9. At this point, control signal CN disagrees with inverter output signal OP.

Two actions are initiated by the occurrence of a transition point in control signal CN. First, drive circuit 14 begins the switching sequence of the inverter power pole. Second, the output of exclusive OR gate Z10 goes high, allowing clock pulses to reach counter Z6 which counts clock pulses until the power pole switches and causes a transition in output waveform OP such that OP agrees with control signal CN, thereby inhibiting further counting by counter Z6. This change in output signal OP also initiates a series of two pulses, generated by monostable multivibrators Z11 and Z12. The output of monostable multivibrator Z11 is the pulse waveform W of FIGS. 1 and 2. This waveform serves to load data from counter Z6 into shift register Z13, which serves as a memory element, and in turn shifts out new data to presettable counter Z9, thereby setting presettable counter Z9 to a new data number before the end of a pulse in waveform W. The pulse of waveform W is also inverted by inverter Z14 and transmitted to monostable multivibrator Z12. The output of multivibrator Z12 is a second pulse waveform equal to the waveform R of FIGS. 1 and 2. The pulses in waveform R reset counter Z6 so that it is ready to count during the power pole switching delay of the next output cycle. The control system is then at rest until the next transition point in reference wave P.

The length of the shift register Z13 is such that one data word, representing switching time of a power pole, is stored for each of the switching points in one inverter output cycle. Thus when current data equal to the number of clock pulses required for a power pole switching operation just completed, is entered into the shift register, the number required for the next switching point is set into the presettable counter Z9. This number represents the switching time of the power pole at a corresponding switching point in the previous inverter output cycle. Thus when reference waveform P next changes, the presettable counter starts counting at a number representing the anticipated switching delay in the associated power pole and counts to its full capacity.

The power pole then switches in a time nearly equal to that of the previous cycle. The result is that the power pole switching duplicates the reference waveform P, but is delayed by a preselected time period T equal to the full count of the presettable counter Z9.

Although the present invention has been described in terms of what is at present believed to be the preferred embodiment, it will be apparent to those skilled in the art that various changes and modifications may be made without departing from the scope of the invention. It is therefore intended that the appended claims cover all such changes that fall within the scope of the invention.

What is claimed is:

1. A pole switch firing control circuit for controlling a pulse width modulated inverter in accordance with a reference pulse signal, said control circuit comprising:
   means for receiving a clock signal containing voltage pulses;
   means for generating a control signal having transition points for initiating a pole switch switching sequence in the inverter;
   a first counter for counting the number of said clock voltage pulses which occur between a selected transition point in said control signal and the switching of an associated pole switch;
   memory means for storing the number of clock voltage pulses counted by said first counter during each pole switch switching sequence; and
   a second counter being presettable to start counting at a number equal to the number of clock voltage pulses previously counted by said first counter during the preceeding switching sequence of said associated pole switch, and connected to count said voltage pulses which occur after a preselected transition point of said reference signal until a preselected count has been reached, whereupon said second counter produces a carry output signal pulse which causes said means for producing a control signal to create a second transition point in said control signal.

2. A pole switch firing control circuit as recited in claim 1, further comprising:
   means for transferring the stored number of voltage pulses for a selected pole switch to said second counter when said selected pole switch will be the next pole switch to be fired.

3. A pole switch firing control circuit as recited in claim 2, wherein said memory means comprises a shift register and said means for transferring comprises a one-shot multivibrator connected to the shift input of said shift register.

4. A pole switch firing control circuit as recited in claim 1, wherein said means for generating a control signal comprises a flip-flop circuit.

5. A pole switch firing control circuit as recited in claim 4, wherein said flip-flop circuit comprises:
   a type D flip-flop circuit having a D input connected to receive said reference pulse signal and having a clock input connected to receive said carry output signal.

6. A pole switch firing control circuit as recited in claim 1, further comprising:
   means for providing only complete clock voltage pulses to said first counter.

7. A pole switch firing control circuit as recited in claim 6, wherein said means for providing only complete clock voltage pulses comprises:
   an AND gate having its output connected to said first counter and having two inputs with a first of said two inputs being connected to said means for receiving a clock signal;
   a flip-flop circuit having a clock input and a Q output, with said Q output being connected to a second one of said two AND gate inputs; and an inverter having an input connected to said means for receiving a clock signal and having an output connected to said flip-flop clock input.

8. A method of controlling the switching of a power pole switch in a pulse width modulated inverter in accordance with a reference pulse signal, said method comprising:

counting a series of clock pulses, which occur between a preselected transition point in a control signal and the switching point of a power pole switch in response to said transition point, with a first counter;

presetting a second counter at a count equal to the number of clock pulses counted by said first counter during a preceding switching cycle of said power pole switch;

operating said second counter to count clock pulses, beginning at the preset count, when a preselected transition point occurs in a reference signal; and causing a second transition point in said control signal to occur when said second counter reaches a predetermined count, thereby initiating a second switching cycle of said power pole switch.

* * * * *